Jan. 1, 1952   W. W. HANSEN   2,580,679
HIGH-FREQUENCY DIRECTIONAL COUPLER APPARATUS
Filed Aug. 16, 1946   2 SHEETS—SHEET 1

INVENTOR
WILLIAM W. HANSEN
BY
ATTORNEY

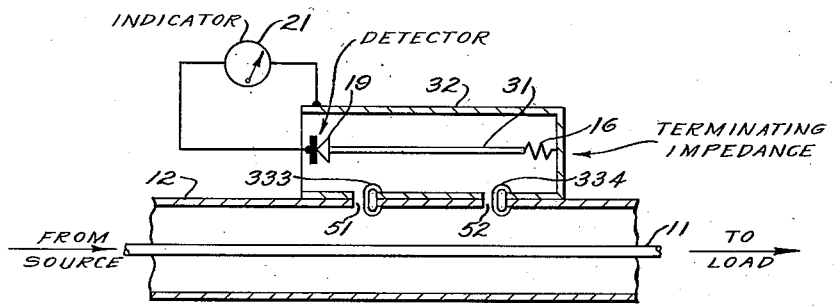
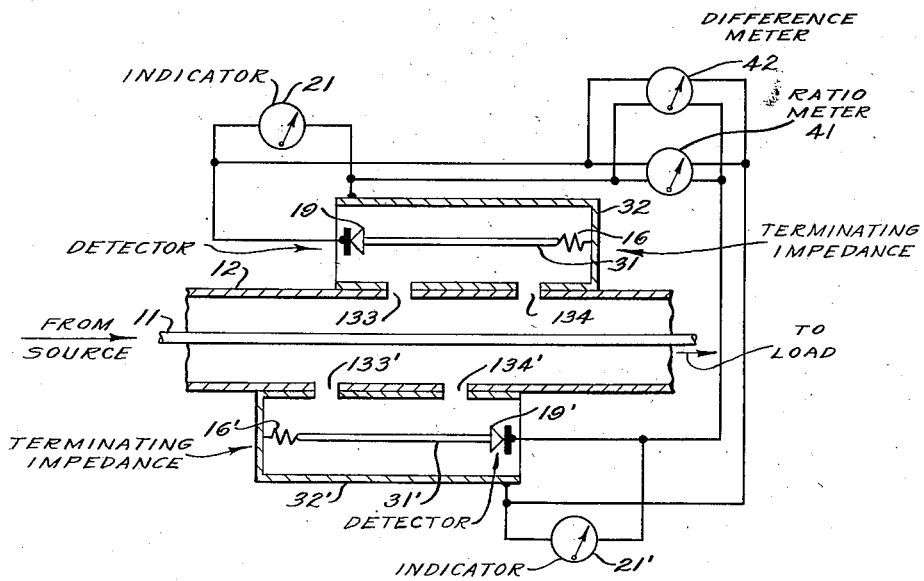

Patented Jan. 1, 1952

2,580,679

UNITED STATES PATENT OFFICE 2,580,679

HIGH-FREQUENCY DIRECTIONAL COUPLER APPARATUS

William W. Hansen, Stanford University, Calif.; Olive D. Ross, executrix of said William W. Hansen, deceased, assignor to The Sperry Corporation, Great Neck, N. Y., a corporation of Delaware Application August 16, 1946, Serial No. 690,986

4 Claims. (Cl. 171—95)

The present invention pertains to the art including ultra-high-frequency energy devices, and more particularly relates to devices responsive to the direction of flow of ultra-high-frequency energy along a conductor and to devices useful for measuring the power flow in selected directions or the standing wave ratio in such a conductor. The present application is a continuation-in-part of my abandoned application Serial No. 499,072 filed August 18, 1943.

As is well known, for the transmission or conduction of ultra-high-frequency energy, either concentric transmission lines or wave guides are generally utilized. With such hollow energy conductors, proper impedance matching is of great importance, since otherwise undesirable reflections of the ultra-high-frequency energy flow occur at impedance discontinuities in the conductor. These reflections produce standing waves which increase losses and materially reduce the power transfer capacity of the conductor. In addition, such standing waves render the system sensitive to small changes; that is, small changes in the length of the various conductors may cause great changes in the operation of the system.

It is therefore of great importance to be able to measure or indicate conveniently the presence of such reflections of standing waves. In the prior art, it has been known to measure or indicate such standing waves by the use of a travelling probe which is adapted to indicate the field intensity or voltage at different points along such an energy conductor. Since standing waves are evidenced by variation in the voltage or the field intensity along the conductor, such a travelling probe can indicate the presence and magnitude of standing waves. However, it is both inconvenient and mechanically and electrically complicated to provide and use such a travelling probe.

According to the present invention, standing waves in an ultra-high-frequency conductor can be directly indicated and measured by totally stationary apparatus which may be permanently incorporated in such a conductor to provide a continuous monitor for the energy flowing therethrough and which requires no adjustment to yield an indication. Furthermore, according to the present invention, apparatus is provided separately and independently responsive to and adapted to measure or indicate or otherwise utilize either the power flow along an ultra-high-frequency energy conductor to a load or the power reflected or travelling in a reverse direction in such a conductor. The ratio or difference of these powers can also be indicated.

The present invention also provides apparatus for directly indicating the standing-wave-ratio and the power transmission efficiency of an ultra-high-frequency energy conductor system, without adjustment.

Other objects and advantages of the present invention will become apparent from a consideration of the following specification and attached drawing, wherein Fig. 1 shows a schematic diagram of one form of the present invention adapted to indicate the amount of unidirectional power flow in an ultra-high-frequency coaxial transmission line;

Figs. 2, 3 and 4 show similar schematic diagrams of modifications of the system of Fig. 1; and Fig. 5 shows a similar schematic diagram of another embodiment of the present invention adapted to indicate directly the standing-wave-ratio or power transmission ratio or incident power or reflected power or their difference, in an ultra-high-frequency energy conductor.

Figures 1, 1A:
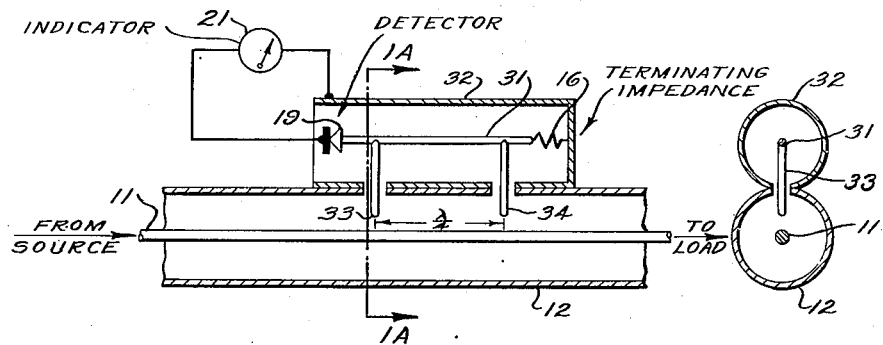
Fig. 1A shows a cross-sectional view of the device of Fig. 1 along line 1A—1A thereof.

Referring to Fig. 1, the ultra-high-frequency energy conductor is indicated in this instance as a concentric transmission line having an inner conductor 11 and an outer conductor 12. It is assumed that this conductor 11, 12 is supplied with energy from a suitable source connected with its left end, and that any desired load is connected to the right end of this conductor 11, 12.

In order to provide an indication of the amount of power reflected from the load, independent of the amount of power flowing to the load, a conductor 31 is provided outside the outer conductor 12 and extending therealong for a distance of somewhat more than one-quarter wavelength of the operating frequency of the system. Conductor 31 forms the inner conductor of a concentric transmission line 31, 32.

Connected at the load end of this line 31, 32 is any suitable type of terminating impedance 16 adapted to properly terminate this line. At the source end of line 31, 32 is connected a crystal detector or other rectifier 19, preferably of the square-law type; although it may be a linear or other known-law detector.

The unidirectional current or voltage produced by detector 19 is then supplied to a suitable indicator 21. Line 31, 32 is excited from main line 11, 12 by a pair of probes 33, 34 connected to inner conductor 31 and spaced a quarter wavelength therealong. Thus, concentric line 31, 32 serves as a high frequency energy-conducting device extending between two points along the hollow high frequency energy conductor or coaxial transmission line 11, 12 separated by a quarter wavelength at the predetermined operating frequency thereof. Also, detector 19 is coupled to the conducting device 31, 32 adjacent the probe 33, while the terminating impedance 16 is coupled to this device adjacent probe 34.

Considering first the junction of probe 33 and conductor 31, it will be clear that a voltage is excited at this point by the wave travelling from left to right in the main line 11, 12. One quarter period later, substantially the same voltage is excited at the junction of probe 34 and conductor 31. A wave generated by this latter voltage then travels leftward along line 31, 32 to the first point considered. Since this latter voltage wave has taken one half period to travel from probe 33 to probe 34 in the main line 11, 12 and back to probe 33 in auxiliary line 31, 32, it arrives in out-of-phase relation with respect to the first voltage. Accordingly then, the two voltages cancel, and no effect is produced on detector 19 or indicator 21 by the rightward wave in main line 11, 12.

It will be noted that the two corresponding voltages reinforce at the junction of probe 34 and conductor 16. However, due to the termination of line 31, 32 by resistor 16, this also has no effect on detector 19, as no reflected wave is then produced in line 31, 32.

With respect to the leftward travelling wave in main line 11, 12, the voltages excited by the two probes at the detector 19 reinforce, so that detector 19 responds solely to the leftward, or reflected wave, and indicator 21 indicates only the reflected power. With a square-law detector 19, indicator 21 will produce readings directly proportional to reflected power. With a linear detector, reflected voltage will be read directly, while with other detectors, the indicator may be suitably calibrated to read power or voltage.

Figure 2:
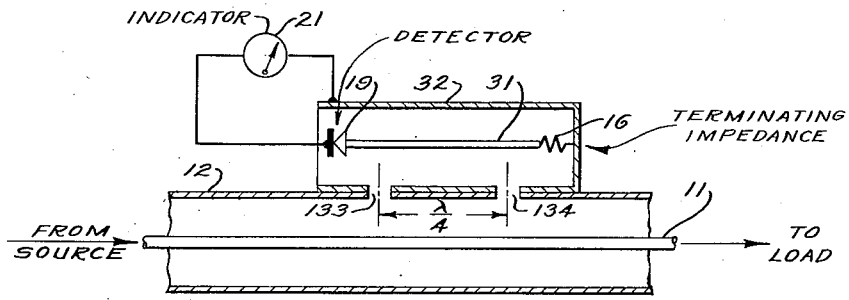
Figure 3:
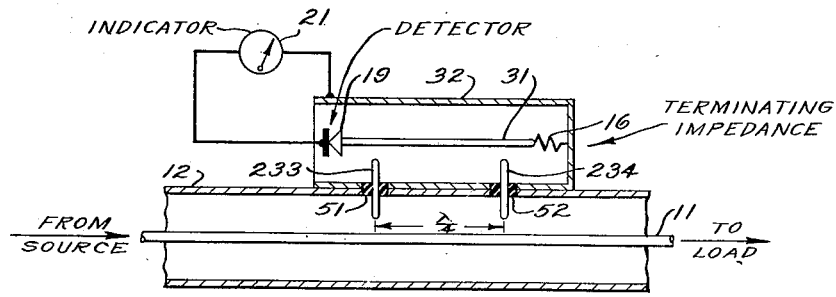

Other forms of energy pickup from the main line 11, 12 than probes 33, 34 may be used. For example, as shown in Fig. 2, energy pickup may be effected merely by a pair of openings 133, 134 in the adjoining outer conductors of lines 11, 12 and 31, 32, similarly spaced substantially one-quarter wavelength apart. Alternatively, as shown in Fig. 3, probes or dipole antennas 233, 234 passing through openings 51, 52 in the adjoining walls of the outer conductors 12, 32 of lines 11, 12 and 31, 32 and insulated therefrom may be used, again preferably spaced one-quarter wavelength apart. In place of such aperture couplings or dipole or probe couplings, closed coupling loops 333, 334 passing through the apertures 51, 52 may be used, as shown in Fig. 4.

The present indicator may easily be utilized to indicate when the system is in the properly matched condition, since then minimum standing waves are produced and zero reflected power would be indicated. Also, if the amount of power supplied to the load is known, the standing-wave-ratio (which may be defined as the ratio of the reflected power to the incident power) can be readily determined.

The present invention can also be utilized to measure simultaneously the incident power and the reflected power, as is shown in Fig. 5. Here, the reflected power is measured by indicator 21 and its associated circuit, which is the same as shown in Fig. 2. At the same time, a similar system having similar but primed reference characters in Fig. 5 will measure the incident power, since it operates in the same manner as in Figs. 1-4, but responsive to the power travelling from left to right.

In place of or in addition to the two separate measuring devices 21 and 21', a combined indicator may be utilized, as is also shown in Fig. 5. By supplying the outputs from detectors 19, 19' to a ratio meter 41, adapted to indicate the ratio of the amplitudes of the two signals supplied thereto, a direct reading of the standing-wave-ratio can be obtained. Similarly, by supplying the detector outputs to a difference meter 42 of any conventional type, adapted to indicate the difference between the amplitudes of the signals supplied thereto, the amount of power actually delivered to the load, as distinguished from both the reflected power and the incident power supplied by the source, is directly indicated.

It will be understood that in any of the systems of Figs. 1, 3 or 4 a second system responsive only to the incident power can be added, as shown in Fig. 5, together with either the separate indicators or the difference meter or the ratio meter of Fig. 5, as may be desired.

It will be further understood that in the system of Fig. 5, the type of couplings between the main and auxiliary transmission lines may be replaced by those shown in Figs. 1, 3 or 4.

It will also be understood that the present invention is not restricted to measuring power, since any suitable output circuit can be substituted for detectors 19 or 19', whenever it is desired to excite such an output circuit in response to power flowing only in a single direction.

Since many changes could be made in the above construction and many apparently widely different embodiments of this invention could be made without departure from the scope thereof, it is intended that all matter contained in the above description or shown in the accompanying drawings shall be interpreted as illustrative and not in a limiting sense.

What is claimed is:

1. Apparatus for monitoring a main high-frequency energy-conductor adapted to be coupled to an energy source at one end, comprising a first auxiliary conductor coupled to said main conductor at two points spaced along said main conductor by substantially a quarter wavelength at the operating frequency, terminating means for terminating said auxiliary conductor in substantially reflectionless manner at one end thereof, said points of coupling being between said one main conductor end and said one auxiliary conductor end, whereby the remaining end of said auxiliary conductor is excited substantially only by waves in said main conductor flowing toward said one end of said main conductor, a second auxiliary conductor coupled to said main conductor at two spaced points therealong separated by substantially a quarter wavelength at said operating frequency, means terminating said second auxiliary conductor in substantially reflectionless manner at the end thereof between said one end of said main conductor and said points of coupling, whereby the remaining end of said second auxiliary conductor is excited substantially only by waves in said main conductor travelling away from said one main conductor end, and output means coupled to the remaining ends of said two auxiliary conductors.

2. Apparatus as in claim 1 wherein said output means comprises respective detector means coupled respectively to said remaining auxiliary conductor ends, and a difference-indicating means coupled to said detector means, whereby the net power flow in said main conductor may be indicated.

3. Apparatus as in claim 1 wherein said output means comprises respective detector means coupled respectively to said remaining auxiliary conductor ends, and a ratio-indicating means coupled to said detector means, whereby the standing wave ratio in said main conductor may be indicated.

4. Apparatus as in claim 1 wherein said output means comprises respective indicator means coupled to said remaining conductor ends for indicating power flow in said main conductor in respective forward and reverse directions.

WILLIAM W. HANSEN.

REFERENCES CITED

The following references are of record in the file of this patent:

UNITED STATES PATENTS

| Number | Name | Date |
|---|---|---|
| 2,151,118 | King | Mar. 21, 1939 |
| 2,153,728 | Southworth | Apr. 11, 1939 |
| 2,400,777 | Okress | May 21, 1946 |
| 2,423,390 | Korman | July 1, 1947 |

FOREIGN PATENTS

| Number | Country | Date |
|---|---|---|
| 545,936 | Great Britain | June 18, 1942 |

OTHER REFERENCES

Publication in Wireless Engineer, vol. 20, Aug. 1943, pages 364–367, called "An Instrument for Direct Measurement of the Travelling Wave Coefficient in Feeders."

Publication, "An Instrument for Direct Measurement of the Travelling Wave Coefficient in Feeders," by Pistelkors & Neuman; "Elektrosvyas," vol. IX, No. 4, April 1941, pages 9–15, copy in Library of Congress. This Russian article has been translated as R. T. P. Translation No. 1525 by the Ministry of Aircraft Production of Great Britain, a nine page photostatic copy of which is found in Division 69, Class 171, subclass 95, unofficial subclass 23.